(12) United States Patent
Hom

(10) Patent No.: US 6,714,130 B2
(45) Date of Patent: Mar. 30, 2004

(54) METHOD AND APPARATUS FOR SENSING GATE POSITION

(75) Inventor: Wayne C. Hom, Rancho Santa Margarita, CA (US)

(73) Assignee: Link Door Controls, Inc., Elmhurst, IL (US)

( * ) Notice: Subject to any disclaimer, the term of this patent is extended or adjusted under 35 U.S.C. 154(b) by 0 days.

(21) Appl. No.: 09/841,811

(22) Filed: Apr. 24, 2001

(65) Prior Publication Data
US 2002/0154022 A1 Oct. 24, 2002

(51) Int. Cl.$^7$ ............................................. G08B 21/00
(52) U.S. Cl. ................... 340/540; 340/686.1; 340/687; 340/686.2; 340/686.6; 340/5.7; 340/5.71
(58) Field of Search ............................. 340/540, 686.1, 340/687, 686.2, 686.6, 5.71, 5.7

(56) References Cited

U.S. PATENT DOCUMENTS 5,230,179 A * 7/1993 Richmond et al. ............. 49/28

* cited by examiner

Primary Examiner—Daryl Pope
(74) Attorney, Agent, or Firm—Fitch, Even, Tabin & Flannery

(57) ABSTRACT

A method and apparatus for operating a security gate, is disclosed which may comprise a driving member connected to the security gate and adapted to move the security gate from a first position to a second position, responsive to operation of the driving mechanism; a position detection device associated with the operating mechanism and adapted to determine a first distance of the driving mechanism from a first reference point and a second distance of the driving mechanism from a second reference point, and to determine the position of the security gate based upon the relation between the first distance and the second distance. The apparatus and method may have the first reference point being the position of the position detector and the second reference point being at a preselected distance from the position detector. The apparatus and method, further, may have the position detector be an ultrasound, radio frequency or light wave, or the like, transmitter/receiver, and the first distance may be is measured by reflecting waves from a moving target moving as does the driving member and the second distance is measured by reflecting waves from a fixed target fixed in relationship to the transmitter/receiver.

39 Claims, 5 Drawing Sheets

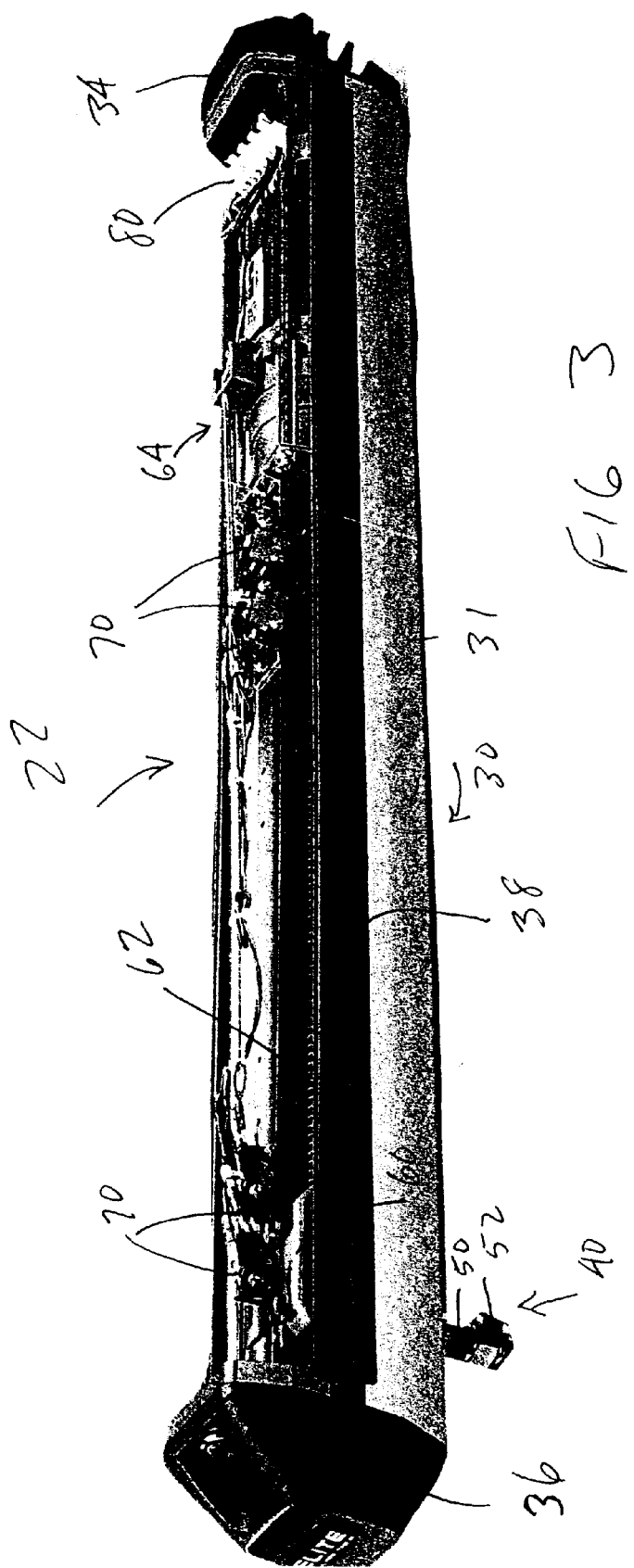

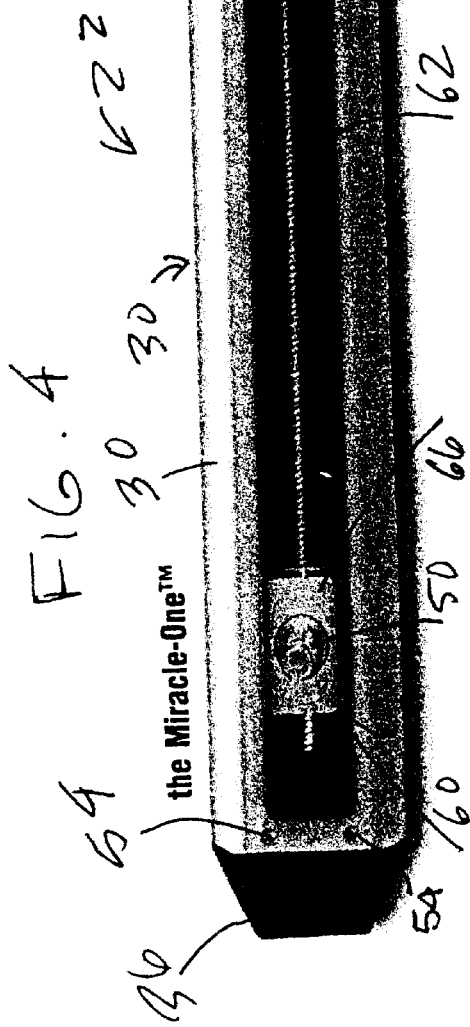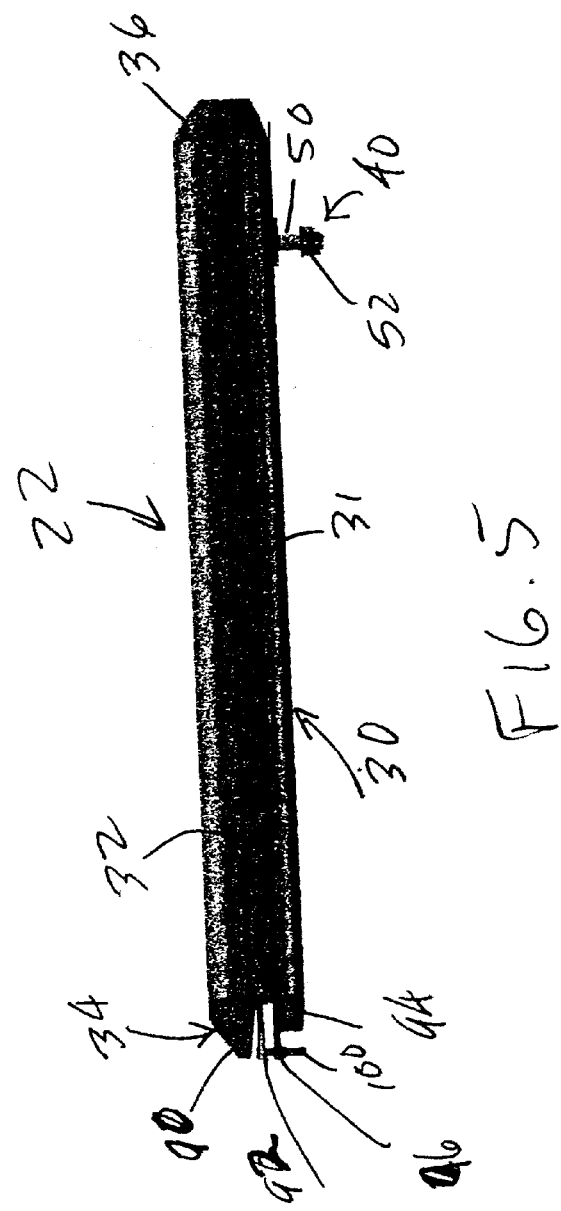

METHOD AND APPARATUS FOR SENSING GATE POSITION

FIELD OF THE INVENTION

The present invention relates to the field of security gate driving mechanism, and more specifically to a method and apparatus for sensing the gate position of a gate being driven by such a gate driving mechanism.

BACKGROUND OF THE INVENTION

It is well known to operate a security gate with some form of motorized driving unit, which can be of a linear or non-linear nature. Typically such a security gate driving mechanism is operated by some form of driving mechanism controller, which, e.g., can control the speed at which the gate moves, vary the speed at which the gate moves during various stages of such movement, stop the gate and/or reverse the gate is the gate is prevented from moving the full extent of its expected movement while the driving mechanism is moving the gate in such direction, etc. Such driving mechanisms in the past have been known to receive input which can more or less grossly position the gate in incremental positions along its movement, such as by the use of limit switches associated with movement of the driving mechanism. For example in a linear driving mechanism, which may be driven, for example, by a worm gear and a carriage threadedly engaging the worm gear, movement of the carriage past certain locations on the travel of the carriage along the worm gear may be sensed by engagement of the carriage with limit switches each placed in a predetermined position along the travel of the carriage, e.g., ¼, ½, ¾ travel points along the full course of movement of the carriage along the worm gear. Similarly, it has been known to sense the position of the gate by, e.g., sensing the position of a hinge mechanism or a portion of a hinge mechanism, with respect to a fixed point to which the gate is swingingly attached, or the angle of a linear drive mechanism with respect to a fixed point in relation to a fixed object to which the gate is swinglingly attached.

These systems, while effective to a degree, suffer from the problem that over time or from time to time the positioning of the driving mechanism is not really representative of the true position of the gate being driven. For example, heat or cold or wear over time can modify the way that the driving mechanism works and/or the travel of the driving mechanism vis-a-vis the positioning of the gate. The driving mechanism, e.g., can become slightly bent or warped, slightly elongated or shortened. In such cases, the position of the gate calibrated to specific locations of limit switches, or calibrated to a specific angle of a driving mechanism relative to some fixed axis of rotation, etc. may not continue to accurately reflect the position of the gate, with respect, e.g., to its fully open or fully shut positions, or other positions along the way, where, e.g., the controller for the security gate driver mechanism is set to alter the speed at which the gate is being driven in one fashion or another. There exists, therefore, a need for a more continuous and precise measurement of the position of the drive mechanism which can be utilized by the security gate drive mechanism, along with other input as to the actual position of the gate to more accurately and safely control the operation of the security gate.

SUMMARY OF THE INVENTION

A method and apparatus for operating a security gate, is disclosed which may comprise a driving member connected to the security gate and adapted to move the security gate from a first position to a second position, responsive to operation of the driving mechanism; a position detection device associated with the operating mechanism and adapted to determine a first distance of the driving mechanism from a first reference point and a second distance of the driving mechanism from a second reference point, and to determine the position of the security gate based upon the relation between the first distance and the second distance. The apparatus and method may have the first reference point being the position of the position detector and the second reference point being at a preselected distance from the position detector. The apparatus and method, further, may have the position detector be an ultrasound, radio frequency or light wave, or the like, transmitter/receiver, and the first distance may be is measured by reflecting waves from a moving target moving as does the driving member and the second distance is measured by reflecting waves from a fixed target fixed in relationship to the transmitter/receiver.

BRIEF DESCRIPTION OF THE DRAWINGS

FIG. 3 (Prior Art) shows a perspective view of the linear drive mechanism of FIG. 2, with the top part of the housing removed;

FIG. 4 (Prior Art) shows a perspective bottom view of the linear drive mechanism of FIGS. 1–3;

FIG. 5 (Prior Art) shows a perspective side view of the linear drive mechanism of FIGS. 1–4.

DETAILED DESCRIPTION OF THE PREFERRED EMBODIMENTS

Figure 1:
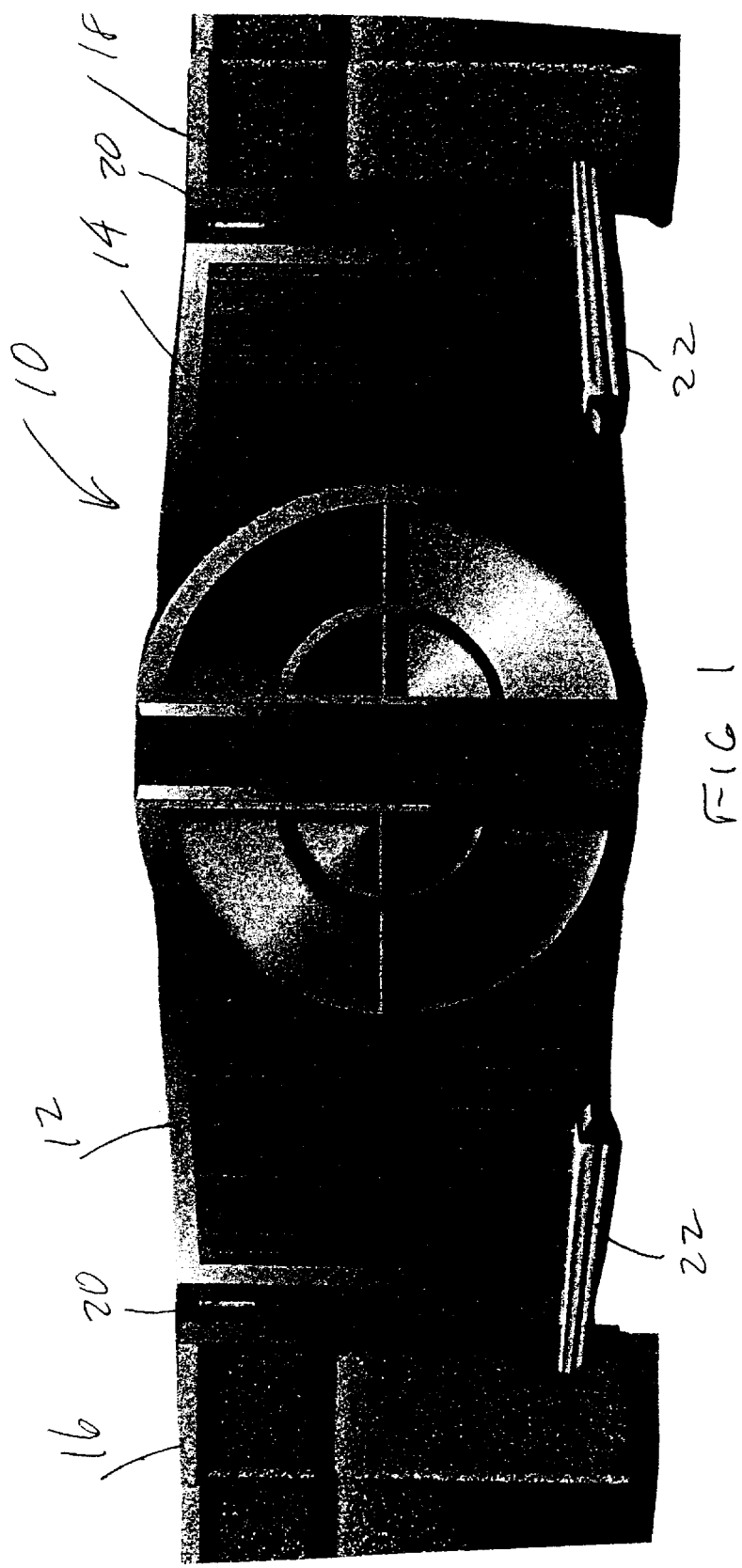
FIG. 1 (Prior Art) shows a perspective view of a security gate with a linear driving mechanism.

Turning now to FIG. 1 (Prior Art) there is shown an example of a known security gate system 10 which can include a security gate having a first swinging gate 12 and a second swinging gate 14. /the first swing gate 12 is attached to a stationary member, such as a wall 16 by hinges 20 and the second swinging gate 14 is attached to a stationary member, such as a wall 18 by hinges 20. Each of the swinging gates 12, 14 is driven by a security gate drive mechanism 22 from a first position to a second position, which can be from fully closed to fully open, with the fully open position being, e.g., at roughly a right angle to the fully closed position.

Figure 2:
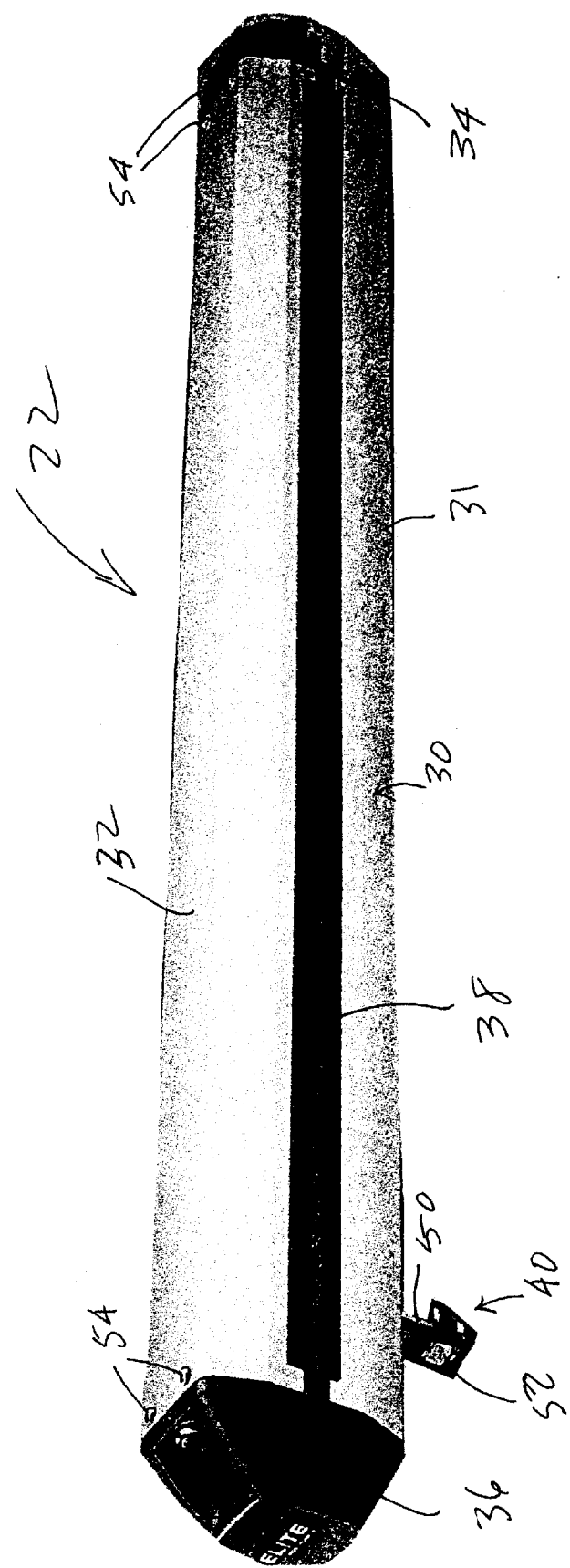
FIG. 2 (Prior Art) shows in more detail a perspective view of the linear driving mechanism for the security gate shown in FIG. 1.

Turning now to FIG. 2, there is shown an example of a known security gate drive mechanism 22. the security gate drive mechanism 22 can have, e.g., a housing 30, which may consist of a bottom half 31 and a top half 32, as well as a side panel 38. The security gate drive mechanism can also have a pivot end cap 34 and a drive end cap 36, to which the top half 32 and bottom half 30 of the housing 30 can be attached, e.g., by screws 54. The pivot end cap 34 of the security gate drive mechanism 22 can be connected, as by pivotal attachment to a fixed structure, e.g., Wall 16 or 18, as shown in FIG. 1. the security gate drive mechanism 22 also has a moving drive member 40, which can include a drive bolt 50 and a drive member nut 52, as more fully described below.

Turning now to FIG. 3 there is shown the security gate drive mechanism as shown in FIG. 2 with the top half 32 of the housing 30 removed. Internally contained within the housing 30 of the security gate drive mechanism 22 can be seen a drive mechanism carriage 60, which can be threadably mounted on a drive mechanism drive screw 62. The drive mechanism drive screw 62 can be rotatably driven by a drive screw drive motor 64, which can be mounted within the housing 30, as be being attached to the pivot attachment cap 34 of the drive mechanism 22. The drive mechanism drive member 40, including the drive bolt 50, can be attached to the drive mechanism carriage 60, as shown in more detail with respect to FIG. 4 below. Also shown to be within the drive mechanism housing 30 are limit switches 70, which in the prior art security gate drive mechanisms 22 can be used to sense the position of the drive mechanism carriage 60, and, therefore, the apparent position of the security gate. Also, inside of the housing 30 can be a wiring harness for bringing input/output control wires and power wires, and the like to the motor 64 and the limit switches 70.

Turning now to FIG. 5 (Prior Art), there is shown a side view of the security gate drive mechanism 22 shown in FIGS. 1–4. As can be seen in FIG. 5, the security gate drive mechanism 22 pivot connection end 34 can have an upper half 90 and a truncated lower half 94. The truncated lower half 94 can have extending there from a mounting pin bottom plate 96. Extending outwardly from the pivot mount end cap 34 intermediate the bottom of the upper half 90 and the pivot pin bottom mounting plate 94 can be an pivot pin upper mounting plate 92. Extending through a hole in each of the upper mounting plate 92 and bottom mounting plate 96 can be a pivot mounting pin 100 which can engage a mounting bracket on the. e.g., fence 16 or 18 to pivotally attach the security gate drive mechanism 22 to the fence 16 or 18. With the drive bolt 50 also suitably pivotally attached to a bracket on the security gate 10 swinging gate 12, 14, respectively, the movement of the respective carriage 60 on the rotating thread 62, can drive the respective swinging gate 12 or 14 between its respective open and shut position.

Figure 6:
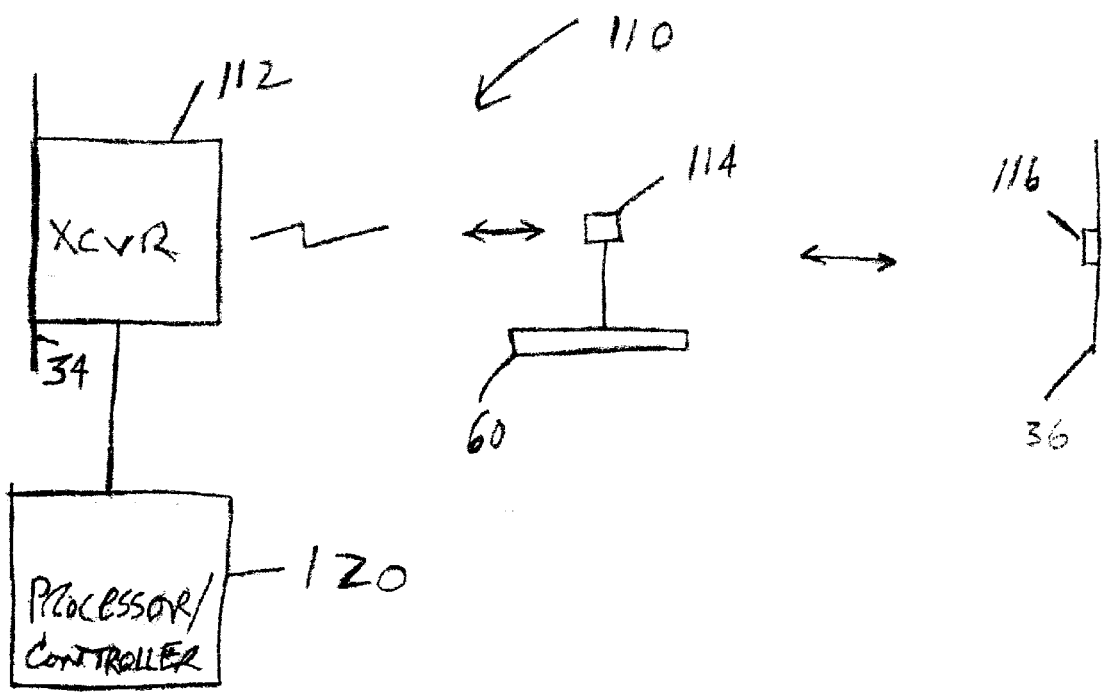
FIG. 6 shows a schematic view of a motion/position detector according to the present invention.

In order to more accurately detect the position of a security gate, such as that described in relation to FIGS. 1–5 an embodiment of the present invention as shown in FIG. 6 can be utilized. Turning now to FIG. 6, there is shown a position/motion detector 110 according to an embodiment of the present invention. The position/motion detector can consist of a transmitter/receiver 112, which can be, e.g., a Murata ultrasonic transmitter/receiver MA40S4R/S or a Panasonic EFR-OUB40K22, which can be operating in the range of e.g., 40–80 KHZ. Other suitable transceivers such as radio frequency transceivers, including those available in integrated circuit form, operating in the manner of a miniature radar set, or other radiation transmitter/receivers, e.g., infrared transmitter/receivers, similarly so operating. The position/motion detection unit 110 can also include a target 114 suitably mounted on, e.g., the carriage 60, for movement in relation to the transmitter receiver 112 as the threaded drive shaft 62 rotates. The transmitter receiver 112 can be mounted, e.g., on the drive end cap 36, interior of the housing 30, or alternatively on the motor 64, as is convenient. The position/motion detector can also have a target 116, which can be mounted at a fixed location in regard to the transmitter receiver 112, e.g., on the interior wall of the drive end cap 36. In operation, the transmitter receiver transmits a pulse of ultrasonic or other radiation some of which reflects from the target 114 and some of which reflects from the target 116. A processor/controller 120 connected to the transmitter/receiver 112 can be utilized to determine the position of the carriage 60, and thus the drive bolt 50 with respect to the position of the transmitter/receiver 112 and the position of the target 116, by, e.g., detecting the range to the target 114 and range to the target 116 and subtracting the two to determine the distance of the target 114 from the target 116, and, therefore the position of the drive bolt 50. In this manner, errors introduced, e.g., by environmental effects such as heat, humidity, moisture, ice, and the like into the determination of the position of the carriage simply from the reflection from the target 114 can be cancelled out. The processor controller can be programmed, along with input, e.g., from sensors on the respective security gate, its hinges and the like, and/or from human input to determine such things as the actual position of the gate at any calculated position of the target 114, and, therefore, be used for a number of control functions for operating the security gate, e.g., changing the speed of movement of the gate and/or the torque applied by the drive motor 64, or both, according to gate position, and, perhaps also such computed factors as gate speed, and distance to fully open or fully shut, and the like. This can also account for such variances as changes in the transmission/reception characteristics of the transmitter/receiver, and like variances.+

I claim:

1. A security gate operating mechanism, comprising:
   a driving member connected to the security gate and adapted to move the security gate from a first position to a second position, responsive to operation of the driving mechanism;
   a position detection device associated with the operating mechanism and adapted to determine a first distance of the driving mechanism from a first reference point and a second distance of the driving mechanism from a second reference point, and to determine the position of the security gate based upon the relation between the first distance and the second distance; and
   wherein the position detector is a wave transmitter/receiver, and the first distance is measured by reflecting waves from a moving target moving as does the driving member and the second distance is measured by reflecting waves from a fixed target fixed in relationship to the wave transmitter/receiver.

2. The apparatus of claim 1 in which the first reference point is the position of the position detector and the second reference point is at a preselected distance from the position detector.

3. The apparatus of claim 2 wherein the position detector wave transmitter/receiver is an ultrasound transmitter/receiver, and the first distance is measured by reflecting ultrasound waves from a moving target moving as does the driving member and the second distance is measured by reflecting ultrasound waves from a fixed target fixed in relationship to the ultrasound transmitter/receiver.

4. The apparatus of claim 2 wherein the position detector wave transmitter/receiver is a radio frequency transmitter/receiver, and the first distance is measured by reflecting radio frequency waves from a moving target moving as does the driving member and the second distance is measured by reflecting radio frequency waves from a fixed target fixed in relationship to the radio frequency transmitter/receiver.

5. The apparatus of claim 2 wherein the position detector wave transmitter/receiver is a light wave transmitter/receiver, and the first distance is measured by reflecting light waves from a moving target moving as does the driving member and the second distance is measured by reflecting light waves from a fixed target fixed in relationship to the light wave transmitter/receiver.

6. The apparatus of claim 3 wherein the driving member is a linear motion device.

7. The apparatus of claim 4 wherein the driving member is a linear motion device.

8. The apparatus of claim 5 wherein the driving member is a linear motion device.

9. The apparatus of claim 6 wherein the driving member is a carriage threadably mounted on a rotatable screw.

10. The apparatus of claim 7 wherein the driving member is a carriage threadably mounted on a rotatable screw.

11. The apparatus of claim 8 wherein the driving member is a carriage threadably mounted on a rotatable screw.

12. The apparatus of claim 7 wherein the driving member is operatively connected to a drive chain.

13. The apparatus of claim 7 wherein the driving member is operatively connected to a drive chain.

14. The apparatus of claim 8 wherein the driving member is operatively connected to a drive chain.

15. The apparatus of claim 7 wherein the driving member is driven by a hydraulic piston.

16. The apparatus of claim 8 wherein the driving member is driven by a hydraulic piston.

17. The apparatus of claim 9 wherein the driving member is driven by a hydraulic piston.

18. A security gate operating mechanism, comprising:
driving means operatively connected to the security gate for moving the security gate from a first position to a second position, responsive to operation of the driving means;
position detection means, associated with the operating mechanism, for determining a first distance of the driving means from a first reference point and a second distance of the driving means from a second reference point, and determining the position of the security gate based upon the relation between the first distance and the second distance; and
wherein the position detector means is a wave transmitter/receiver, and the first distance is measured by reflecting waves from a moving target moving as does the driving means and the second distance is measured by reflecting waves from a fixed target fixed in relationship to the wave transmitter/receiver.

19. The apparatus of claim 18 in which the first reference point is the position of the position detector means and the second reference point is at a preselected distance from the position detector means.

20. The apparatus of claim 19 wherein the position detector wave transmitter/receiver means is an ultrasound transmitter/receiver, and the first distance is measured by reflecting ultrasound waves from a moving target moving as does the driving means and the second distance is measured by reflecting ultrasound waves from a fixed target fixed in relationship to the ultrasound transmitter/receiver.

21. The apparatus of claim 19 wherein the position detector wave transmitter/receiver means is an radio frequency transmitter/receiver, and the first distance is measured by reflecting radio frequency waves from a moving target moving as does the driving means and the second distance is measured by reflecting radio frequency waves from a fixed target fixed in relationship to the radio frequency transmitter/receiver.

22. The apparatus of claim 19 wherein the position detector means wave transmitter/receiver is a light wave transmitter/receiver, and the first distance is measured by reflecting light waves from a moving target moving as does the driving means and the second distance is measured by reflecting light waves from a fixed target fixed in relationship to the light wave transmitter/receiver.

23. The apparatus of claim 20 wherein the driving means is a linear motion device.

24. The apparatus of claim 21 wherein the driving means is a linear motion device.

25. The apparatus of claim 22 wherein the driving means is a linear motion device.

26. The apparatus of claim 23 wherein the linear motion device is a carriage threadably mounted on a rotatable screw.

27. The apparatus of claim 24 wherein the linear motion device is a carriage threadably mounted on a rotatable screw.

28. The apparatus of claim 25 wherein the linear motion device is a carriage threadably mounted on a rotatable screw.

29. The apparatus of claim 23 wherein the linear motion device is operatively connected to a drive chain.

30. The apparatus of claim 24 wherein the linear motion device is operatively connected to a drive chain.

31. The apparatus of claim 25 wherein the linear motion device is operatively connected to a drive chain.

32. The apparatus of claim 23 wherein the linear motion device is driven by a hydraulic piston.

33. The apparatus of claim 24 wherein the linear motion device member is driven by a hydraulic piston.

34. The apparatus of claim 25 wherein the linear motion device is driven by a hydraulic piston.

35. A method of operating a security gate, comprising:
driving the security gate between a first position to a second position, utilizing a driving mechanism;
detecting with a position detector the position of the driving mechanism at a first distance from a first reference point and simultaneously at a second distance from a second reference point, and determining the position of the security gate based upon the relation between the first distance and the second distance; and
wherein the position detector is a wave transmitter/receiver, and the first distance is measured by reflecting waves from a moving target moving as does the driving mechanism and the second distance is measured by reflecting waves from a fixed target fixed in relationship to the wave transmitter/receiver.

36. The method of claim 35 wherein the first reference point is the position of the position detector and the second reference point is at a preselected distance from the position detector.

37. The apparatus of claim 36 wherein the position detector wave transmitter/receiver is an ultrasound transmitter/receiver, and the first distance is measured by reflecting ultrasound waves from a moving target moving as does the driving mechanism and the second distance is measured by reflecting ultrasound waves from a fixed target fixed in relationship to the ultrasound transmitter/receiver.

38. The apparatus of claim 36 wherein the position detector wave transmitter/receiver is an radio frequency transmitter/receiver, and the first distance is measured by reflecting radio frequency waves from a moving target moving as does the driving mechanism and the second distance is measured by reflecting radio frequency waves from a fixed target fixed in relationship to the radio frequency transmitter/receiver.

39. The apparatus of claim 36 wherein the position detector wave transmitter/receiver is a light wave transmitter/receiver, and the first distance is measured by reflecting light waves from a moving target moving as does the driving mechanism and the second distance is measured by reflecting light waves from a fixed target fixed in relationship to the light wave transmitter/receiver.

* * * * *